Oct. 17, 1961 P. A. KRANZ 3,004,702
AUTOMATIC CLASSIFICATION APPARATUS
Filed Jan. 22, 1957 5 Sheets-Sheet 3

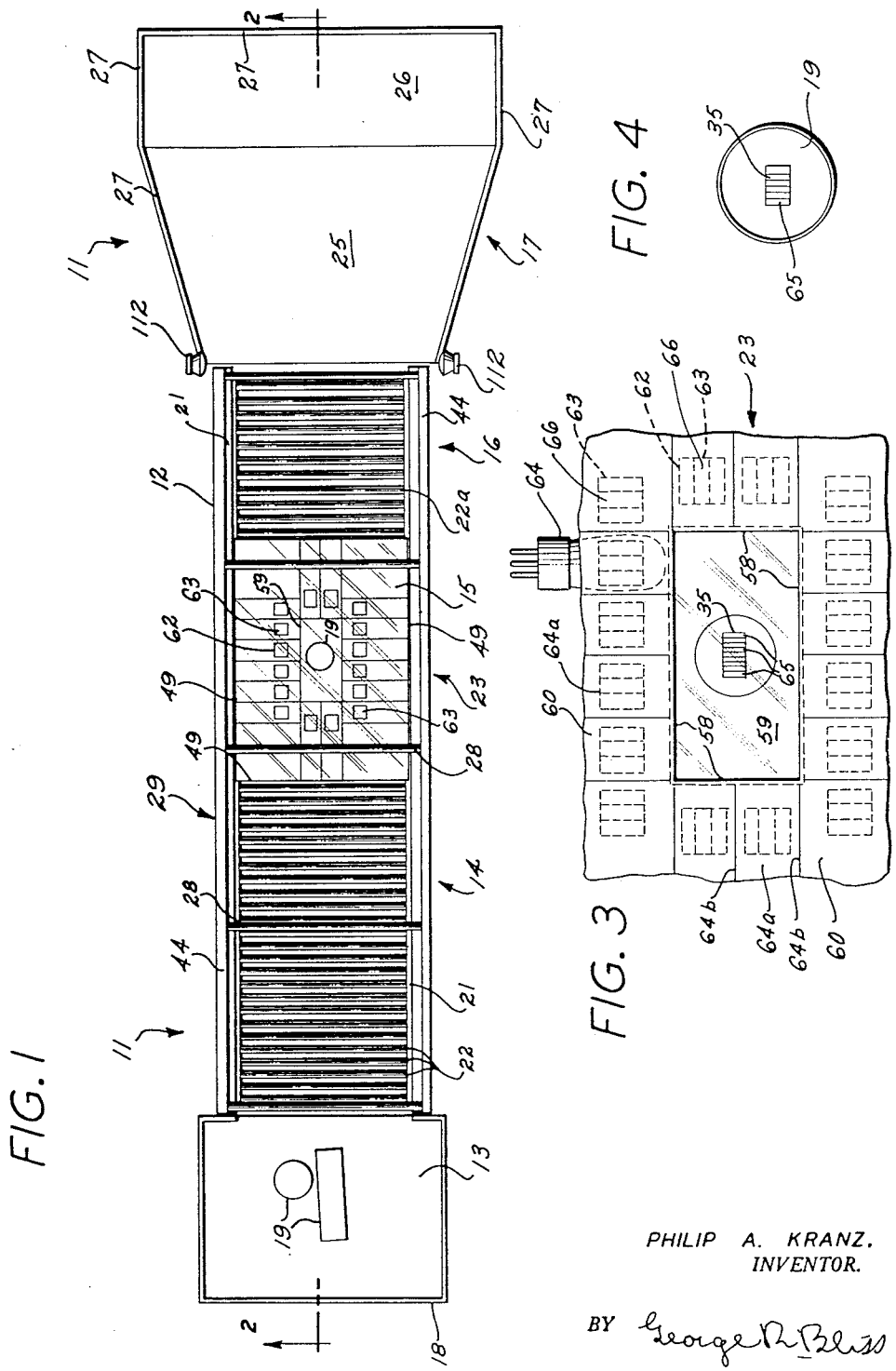

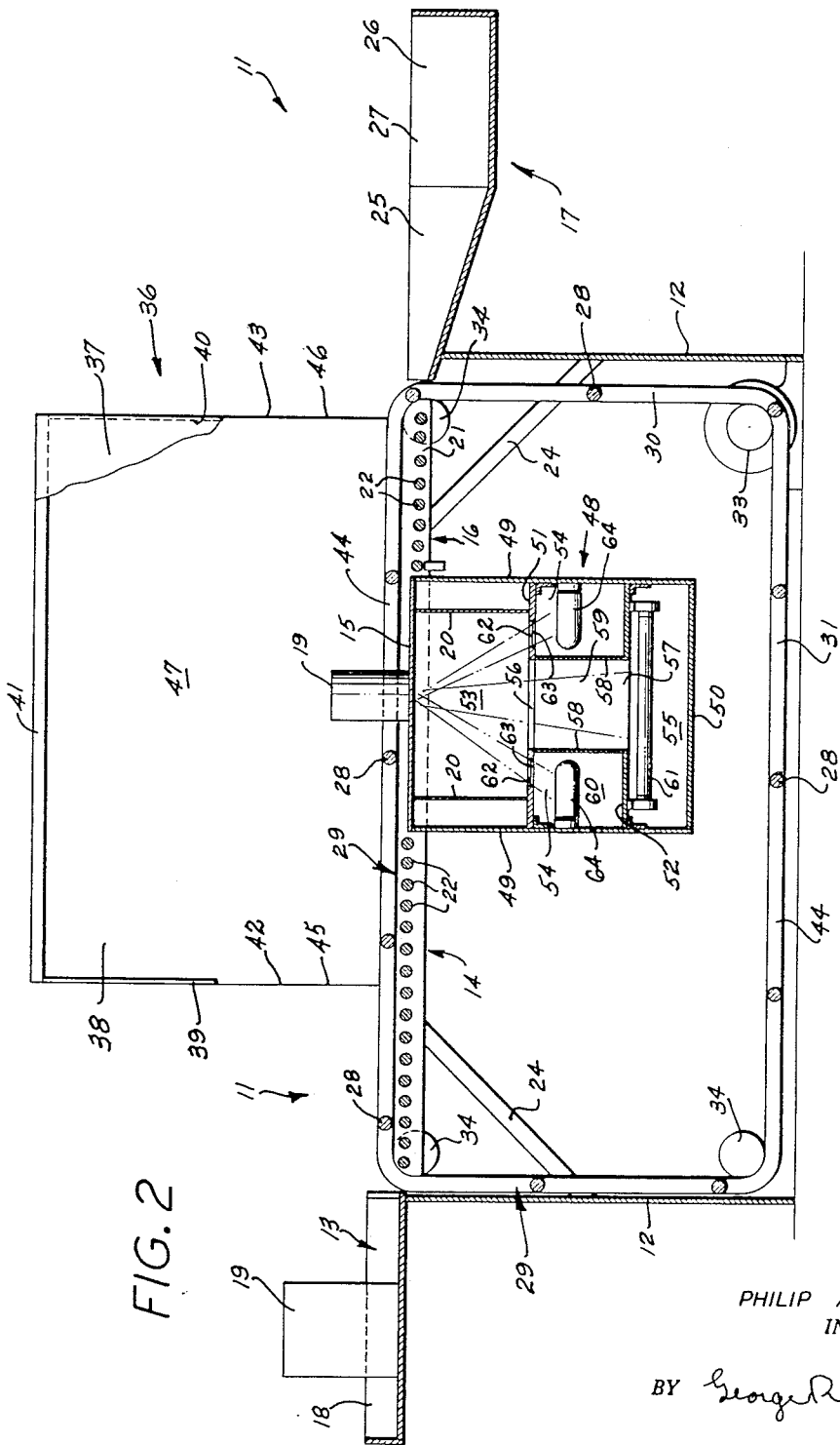

PHILIP A. KRANZ,
INVENTOR.

BY George R. Bliss

ATTORNEY

Oct. 17, 1961 P. A. KRANZ 3,004,702
AUTOMATIC CLASSIFICATION APPARATUS
Filed Jan. 22, 1957 5 Sheets-Sheet 4

PHILIP A. KRANZ,
INVENTOR.

BY George R. Bliss
ATTORNEY

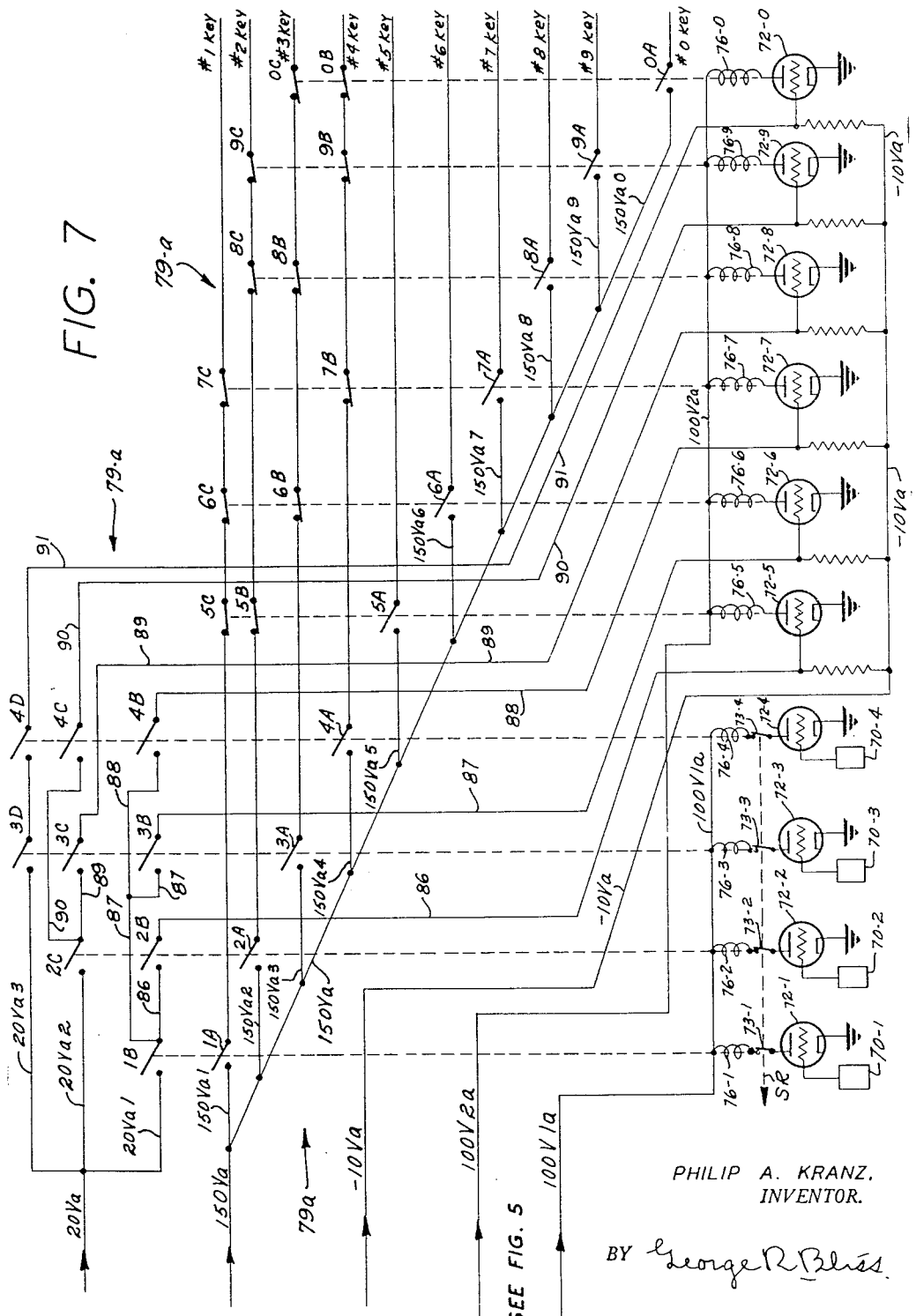

United States Patent Office 3,004,702
Patented Oct. 17, 1961

3,004,702
AUTOMATIC CLASSIFICATION APPARATUS
Philip A. Kranz, Canoga Park, Calif.
(Rte. 1, Box 28, Melbourne Beach, Fla.)
Filed Jan. 22, 1957, Ser. No. 641,788
6 Claims. (Cl. 235—61.11)

This invention relates to the art of automatic article classification, and particularly to article classification by the utilization of differentially chromatically colored materials on the articles, put there for coded identification of differentiating descriptive properties of the articles, or even naturally present on the articles by their inherent nature or applied thereto intentionally for reasons other than the coded indication of a class, such as the reason of ornamentation.

It is one object of the invention to provide apparatus for classifying articles according to the photo-sensitive electronic response to the chromatic colorings (i.e. the hues) on the articles which constitute class identifications and which have been caused to be present on the surfaces of the articles as a coded identification of the class, or which may have been already present thereon and may be themselves the basis of the classification.

It is another object of the invention to provide for the operation of terminal mechanism in correlation with the respective classes of the articles, such as price registers, inventory totalizers, processing devices for index cards, such as time cards, production and job control cards, and filing system cards of all kinds, and such as differential storage equipment, and differential counting of articles as they pass a given point.

It is another object of this invention to provide classifying equipment adapted to use a very large number of chromatic differentiated discrete colors from the electromagnetic spectrum between the present practical limits, i.e., between about 2000 to 3000 angstrom unit wave lengths, and about 9000 to 10,000 angstrom unit wave lengths. The opacity of air and conventionally used optical materials at present prohibits the use of light of wave lengths less than 2000 angstroms. The quanta of light of wave lengths longer than 10,000 angstroms apparently possess so little energy that they do not produce usable photoelectric effects in substances now practical for the purpose.

It is another object of the invention to provide classifying equipment adapted to use as coded class identifiers, respectively distinctive chromatic colored lights, which will control the operation of terminal machinery to simultaneously perform a plurality of differentiated operations affecting and correlated with any one of the classified articles, in response to class identifying coded colored light signals received from that one article.

The standard coded signal means for identifying classes of a genus of paperboard index cards or other thin articles is by the use of cutout slots or openings in the cards, dimensioned and spaced and otherwise arranged to provide for closing differentiating combinations of electrical circuits through the slots or openings, each combination corresponding to a classification species, and each providing for effecting a correlated operation on the cards. It is obviously impossible to provide slots or other openings for establishing electrical signaling circuits therethrough, in many articles which are to be classified. The coloring materials used in this invention may be applied directly to the articles in the form of relatively very small markings, or to tags which may be adhesively or otherwise applied to the articles. Punched cards such as are now used for card classification purposes in business machines would have to be attached to other kinds of articles to be classified; there is no practical way in which these cards could then be fed through the sensing electrical devices required for signaling and/or recording the classification data.

It is therefore another object of this invention to provide a classification system and apparatus which will employ chromatic colors to initiate the signaling of the classification data to widen the field of use of classifying apparatus.

It is another object to effect the signaling of the classification data in a rapid simple manner. An appreciable time interval is required for the making of electrical contacts through openings in cards or other thin articles. In the apparatus of this invention, the signaling of the classification data is made at the speed of electromagnetic wave energy. Furthermore the color markings need be arranged in no particular manner on an article, other than that they be so arranged that they are all within the light range of the scanning apparatus.

The drawings and descriptive specification which are herein presented illustrate an embodiment of the invention designed to register the prices of articles of merchandise sold in retail stores and particularly foods and other kinds of merchandise customarily sold in the so-called supermarkets. It is to be understood that this particular adaptation is only one of many adaptations of the invention and that the invention is usable wherever in industry, business or in the handling or processing of articles of one genus embracing many species, it is desired to perform operations upon or related to or affecting the articles, either several operations varying in character but simultaneously initiated or executed, or one operation of a complex nature, combining several phases or parts, the several operations in the one case, and the phases or parts of an operation in the other case being correlated with the species of the article being handled or processed.

FIGURES 1, 2, 3 and 4 are views of an automatic cash register checkout stand such as are used in food markets, particularly in the so-called supermarkets, which checkstand is an embodiment of the invention and utilizes as an example 16 photoelectric tubes. These views are of a functional schematic character, omitting many of the structural elements of the checkstand which are not pertinent to the invention and may be designed in many different ways to meet the requirements of particular installations of checkstands without adding to or subtracting from the inventive combinations defined in the claims.

FIGURES 5, 6 and 7 are diagrammatic representations of the electrical circuits used in such a 16 tube checkout stand embodiment of the invention.

FIGURE 1 is a plan view of a checkstand embodying the invention, with the light shield cover removed.

FIGURE 2 is a longitudinal vertical sectional view of the checkstand taken along the line 2—2 of FIGURE 1.

FIGURE 3 is a bottom plan layout view on an enlarged scale of the filters and phototubes of the viewing head, showing schematically one only phototube in its relative position with its associated filter as typical of all the other phototubes and filters, the bottom wall and lamp of the viewing box being omitted for clarity.

FIGURE 4 is a bottom plan view of a can of merchandise with a control tag thereon.

FIGURE 5 shows diagrammatically the electric circuit 9 of a four section machine, each section having four photoelectric tubes, showing the power supply, the several voltage mains energized thereby, and the mechanism for controlling and terminating a single key-operating cycle, once it has been initiated by the photoelectric tube or tubes in any given key operation.

FIGURE 6 is a layout of the equipment for energizing the circuitry associated with the four filters and phototubes of any one section of the sixteeen tube machine, the viewing head being shown schematically.

FIGURE 7 is a diagram of the electric circuits and relays by which these four filters and their associated phototubes are utilized to operate a predetermined one only, of as many as ten cash register keys controlled by this one section of the machine.

Figure 5:
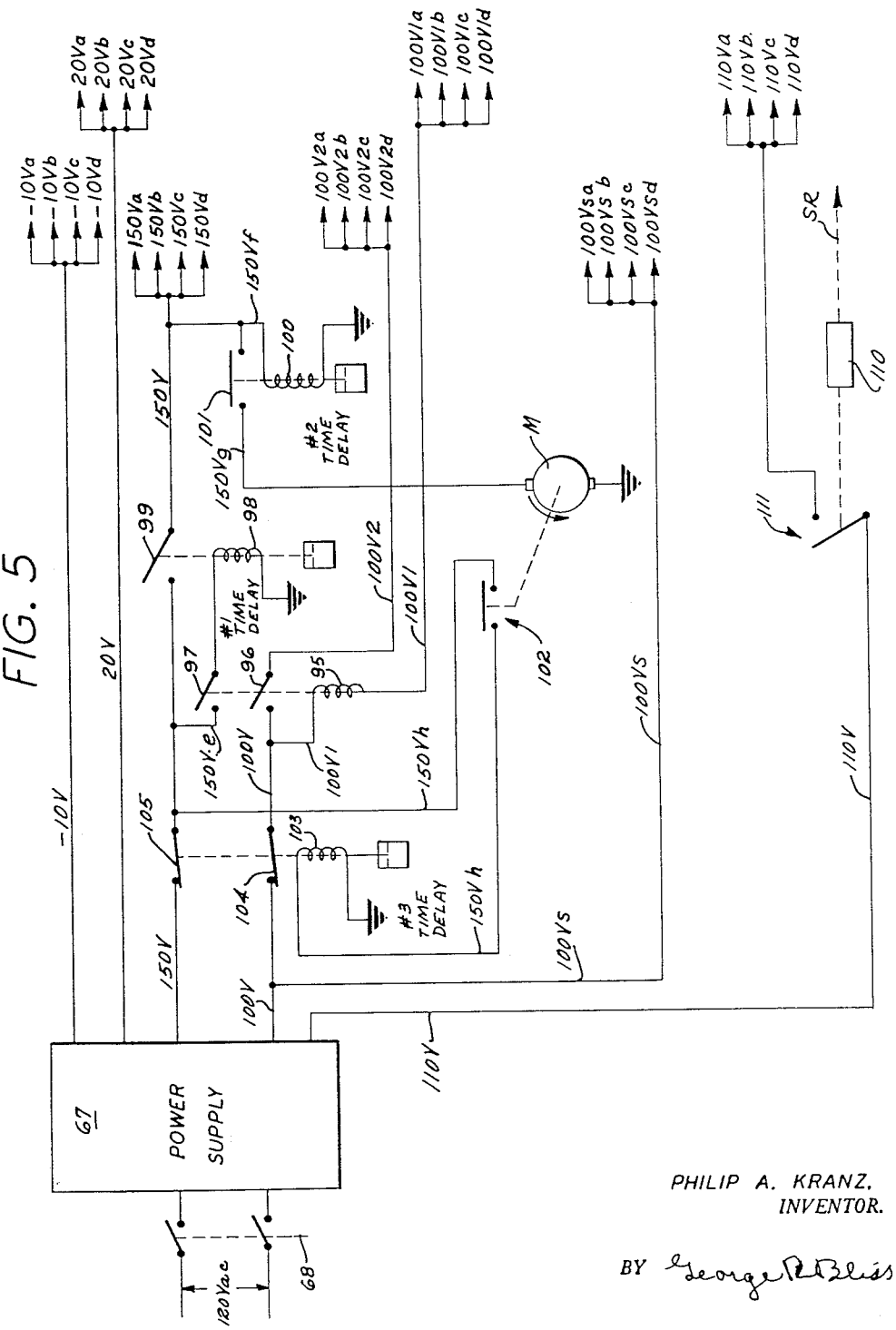

A horizontally disposed supporting table 11 for the merchandise is mounted on any suitable framework, such as that designated by the numeral 12 on FIGURES 1 and 2. The table 11 may be considered as having five sections, 13, 14, 15, 16 and 17. Section 13 at the left end of the machine is a receiving platform preferably provided with retaining flanges 18 and upon which the items of merchandise are placed by an attendant as he removes the items from the wheeled basket or other container in which they are brought from the shelves, refrigerator cases or other merchandise supports arranged about the display area of the store. The merchandise items may be placed upon the platform 13 by the customer, but as will appear later in this description of the machine, they must be alined in a single file row on the adjoining section 14 of the table 11 as they move or are moved from the platform 13.

The next section 14, of the table 11 is at the same level as the platform. This section 14 consists of a plurality of idling transverse rollers 22 mounted on a pair of longitudinally arranged bars 21 which are a part of the framework 12, these bars being disposed along the two sides of the machine respectively and suitably braced as at 24, 24. Section 15 of the table is a plate of glass or other transparent material of substantially the same width as the length of the rollers 22. It is mounted on top of the viewing box 48, described below, which in turn is suitably secured to the bars 21.

The next rightward section 16 of the table 11 consists of additional rollers 22a also mounted on the bars 21 and otherwise similar to the rollers 22 described above. The next and furthermost rightward section 17 of the table 11 is a packaging platform for the reception of the merchandise items from the rollers 22a, and disposing them in position for convenient packing by an attendant in bags, boxes or other containers. This packaging platform 17 may consists of an inclined smooth surfaced chute 25 with downwardly and outwardly flaring sides, and a substantially horizontal terminal receiver 26, the chute and receiver being preferably provided with lateral retaining walls 27.

The items of merchandise 19, which may be cans, paperboard boxes, bags, wrapped green goods, packages of meat, cheese or the like, are moved one at a time on to the rollers 22 of table section 14. They are moved thereon successively at such time intervals that the items are engaged and conveyed singly and one at a time by pusher bars 28 respectively, which are the flights of a conveyer 29. This conveyer travels along an endless path over table sections 14, 15 and 16, downwardly over a vertical leg 30, then over a return horizontal leg 31 and upwardly over a vertical leg 32 to the upstream end of table section 14. The lateral traveling strands 44 of the conveyer, between and to which the pusher bars 28 are attached, may be of the sprocket chain, or flexible belt or other suitable type, and may be driven as shown in FIGURE 2, by a power driven sprocket wheel or pulley 33, and controlled and guided in its path of movement by idler sprocket wheels or pulleys 34. Each pusher bar 28 propels a single item of merchandise over section 14 of the table, over the transparent cover plate 15 of the viewer box 23, and over the table section 16, pushing it on to the chute 25, from which it slides under the action of gravity onto the packaging platform 17. The pusher bars and the merchandise items travel at a steady constant speed over the table sections 14, 15 and 16. Each item has affixed to it a tag 35 presenting downwardly one or more colored surfaces. The tag may also carry a price mark or the price may be otherwise indicated to the customer as he inspects the tiers and compartments of goods, and selects the desired items. It will be understood that the tags may be attached to the bottom of the item, or the tag may be attached to any other surface of the item, just so the tagged surface be directed downwardly when in position on the conveyer 29.

Light of different wave lengths, and so of different colors, emanating from these tags 35, is used to actuate selectively, photoelectric tubes which in turn electronically energize a plurality of associated devices, which in the embodiment of the invention described herein are registering devices for printing upon a paper tape, the prices of the tagged items of merchandise. The colored tags and differingly colored light therefrom, thus perform the function performed manually on a conventional so-called cash register, which may be more correctly termed a price register.

Since many items of merchandise sold in the supermarkets and stores of other types, have colored surfaces or have wrappings having colored surfaces, in such adaptations of this invention, the light which emanates from the tags 35 must be incapable of emanation from any other surfaces than that of the tags. Otherwise, colored surfaces, other than those of the tags, would also operate the price register with resulting confusion and inaccuracy of result. To eliminate the effect of colors on the surfaces of merchandise items, other than the tag colors, a hood or light shield 36 is placed immediately above the central portion of the table 11. This light hood has opaque side walls 37 and 38, extending longitudinally of the machine, opaque front and rear end walls 39 and 40, and an opaque top cover 41.

The end walls 39 and 40 have large openings 42 and 43 formed therein extending upwardly from the bottom plane of the hood and transversely over the major portion of the width of the shield. The openings 43 and 42 are covered by curtains 45, 46 of flexible, opaque material the lower edges of which lie close to the conveyer 29 and the travel path of the merchandise items thereupon. These curtains yield to permit the passage of each item into or out of the light shield chamber 47. The chamber 47 is substantially completely dark except for brief intervals while the one curtain or the other is opened by a moving item of merchandise.

In order to have the price register operated by light rays from tags bearing colors indicative of the prices respectively of the items and by no light rays coming from other colored surfaces, (1) each tag is colored by a paint or dye which fluoresces when ultraviolet rays of for example 2537 angstrom units impinge upon it. and emits light of a wave length predetermined by the chemical composition of the paint or dye, and (2) the items are passed through a lightproof chamber, in which they are illuminated by such ultraviolet or so-called black light and are shielded from illumination by daylight or from any other light source. By coloring a relatively small number of areas on each tag, as for instance from four to eight areas, with as many different colored paints or dyes subject to fluorescing when illuminated by ultraviolet light, a relatively large number of register keys or other end devices can be operated as will be presently explained.

Light rays of an overall frequency spectrum from about 3000 angstrom units to 9000 angstrom units, which includes the colors visible to the human eye plus the near ultraviolet and near infrared colors, may be separated by properly constructed filters of transparent material into a plurality of small spectral bands of wave lengths of adjacent angstrom values of sufficient luminous intensity (candlepower) to cause a photo-electric tube to generate an electric current of a power sufficient for the operation of solenoid relays or for other practical operative purposes. It is possible to separate by the filtering process, the light rays of the above defined frequency spectrum into as many as twelve to sixteen or possibly more small spectral bands, each sufficiently different in color and each sufficiently intense to act upon one only of several photoelectric tubes, and thus operate an associated relay. While these bands of light rays are not monochromatic (one color only) but embrace wave lengths over a small range of angstrom unit values of spectrally adjacent monochromatic colors, for convenience of reference, each of these small bands of wave lengths passing through any one filter will be termed a "color."

Assuming that sixteen such smaller spectral bands of colored light may be created by filters, then the light reflected from a tag having applied thereto one only of the sixteen colors (using the word "color" as just defined) will pass through one only of sixteen filters, will impinge upon the photosensitive surface of a photoelectric tube associated with that filter, and create an electronic signal which after suitable amplification trips a thyratron which actuates a relay which may be mounted to close an electric circuit to operate a key on the price register.

The price registers conventionally used, have keys to print 3 digits to indicate prices from 0 to 9.99, 30 keys in all, which will have to be operated by twelve colors. Or if the price register is constructed to register prices up to $99.99, 40 keys will have to be operated by the sixteen colors. Or the register may be constructed and designed to register prices to $9.99 and also to indicate by letters or other symbols, the department or classification of goods into which a purchased item falls, as for instance "Meats," "Groceries," "Produce," "Bakery," and also to indicate "sales tax" or other information. Such a machine requirement also requires more than 30 keys, but probably not more than 40 keys, all to be operated by less than half that many colors.

Because of the practical limitations of the filtering operation, imposed by the nature of the light spectrum, and because of the frequent need in designing a machine of this invention for the operation of a large number of end devices (register keys or any other devices for realizing end results) the tags or other work objects must often be provided with two or more colors which operate on two or more separate assemblies of filters, phototubes, and electrically energized circuits, so interconnected and so provided with relays, switches and other circuit elements that when such two or more assemblies are operated, the end device associated with each separate one of the two or more assemblies will not be operated, but instead another and distinct and separate end device will be operated.

With this understanding of the need for the operation of more end devices than the number of filterable colors available for the operation of the machine, the description of the particular type of machine selected to illustrate an embodiment of the invention, will be continued.

Beneath the light shield chamber 47 and separated therefrom by the glass plate 15 is a viewing or scanning box 48 enclosed by four lightproof downwardly extending walls 49 and a bottom wall 50. This box has mounted therein by any suitable type of construction two horizontal opaque platforms 51 and 52 which divide the interior of the box into an upper chamber 53, an intermediate chamber 54, and a lower chamber 55. Each of the platforms 51 and 52 has relatively large openings 56 and 57 therein which are vertically alined with each other. Between the bounding edges of these openings are disposed four vertical walls 58 defining a well 59 which connects the chambers 53 and 55 and excludes light from the peripheral remaining portion 60 of chamber 54. An ultraviolet lamp 61 is mounted in chamber 55 adjacently below the opening 57 in position to throw its light rays through the well 59, up into the chamber 53, where it impinges upon the colored areas 65 on the tags 35 on the under side of the items of merchandise 19. Upper chamber 53 is shortened by additional end walls 20 within the box walls 42, to cut off stray light from the curtained ends of chamber 47 and to prevent light from lamp 61 illuminating more than one tag at a time on plate 15.

The platform 51 has formed therein a plurality of relatively smaller openings 62 surrounding the opening 56 in which are mounted light filters 63. Each of these filters is made to transmit light of a color different from that transmitted by any other one of the filters. As will be more fully considered below, each filter, or at least some of them, is composed of two plates of glass or other transparent material of two different colors respectively for the purpose of cutting off all but a small band of spectrally adjacent wave lengths. In the particular embodiment shown and described herein there are sixteen of these filters. Each has associated with it a photoelectric tube 64, mounted in its own dark chamber 64a between partition walls 64b, and each having a photo cathode surface 66 adapted to generate an electronic flow when exposed to the light rays of the color coming through the associated filter.

The machine shown and described is designed to operate forty keys of a price register which is adapted to print in columnar arrangement vertical rows of lines of four characters, each character being any one of the ten digits 0 to 9, or each of the first three characters being any one of the ten digits from 0 to 9 followed by a fourth character indicative of something other than price, as for instance a class of merchandise. The filters, each with an associated phototube, and electronic devices operated thereby, are arranged in groups of four. Since sixteen filters are shown in this machine, there are four such groups of four. However, each group may comprise more or less than four, depending upon the adaptation of the machine. In a four-character line printing device such as a price register, each group of four performs the function of printing one only of the four characters in a printed line. Thus one group operates the keys printing the number of dollars in the price of an item. One group operates the keys printing the number of dimes in the price of an item, and one group operates the keys printing the number of cents in the price of an item. Another group either operates the keys which print the number of tens of dollars in the price of an item, or characters indicative of other information with regard to an item of merchandise, such as the kind of goods, the sales tax and the like.

If ten different characters are to be printed by a group of four phototubes and their associated filters and electronic devices, i.e. the digits 0 to 9, four of the filters and associated phototubes will operate the keys respectively printing from 1 to 4. Then by simultaneously energizing different pairs of these same phototubes by exposing them simultaneously to illuminating lights of their two associated wave lengths from tags colored to reflect two such wave lengths, and by an interlocking arrangement of relays, 6 additional keys printing from 5 to 0 will be operated, since there are 6 such different pairs of the four phototubes which when sensitized singly and alone operate keys printing but one numerical character.

This use of one or more groups of actuating devices, as for example four groups, each group consisting of a plurality as for example four actuating devices to produce four different end results respectively when each acts alone, and additional end results as for example six, when the actuating devices are operated simultaneously in pairs, and still more end results when combinations of more than two are simultaneously used, is a well known and conventional expedient in computing machines and the like. When such a numerical grouping of actuating devices is adapted to a phototube operated machine utilizing filtered sensitizing light of a plurality of different wave lengths, a machine is produced the circuitry of which is illustrated in FIGURES 5, 6 and 7 of the drawings.

In FIGURE 5, a conventional power supply device is indicated by the numeral 67. It receives electric power from a power source, through a master switch 68 and is constructed to supply the circuitry of the machine with direct current of 150 v., 100 v., 20 v., and 110 v. with negative ground return, over mains 150V, 100V, 20V and 110V respectively, and with direct current of 10 v. with positive ground return, over main −10V. Each of these mains has four branches designated with the suffixes $a$, $b$, $c$, and $d$ leading, respectively, to the circuitry of 4 sections of a 16 channel pickup head, each section having 4 channels. The details of the circuitry of the four sections are similar. The circuitry of section $a$ is shown in FIGURES 5, 6 and 7. In FIGURE 5 the leads only are shown from mains 150V, 100V, 20V, −10 V and 110 V to section $a$ and the other three sections. This figure also is a diagrammatic representation of the circuitry and devices of the time control system of the machine.

Figure 6:
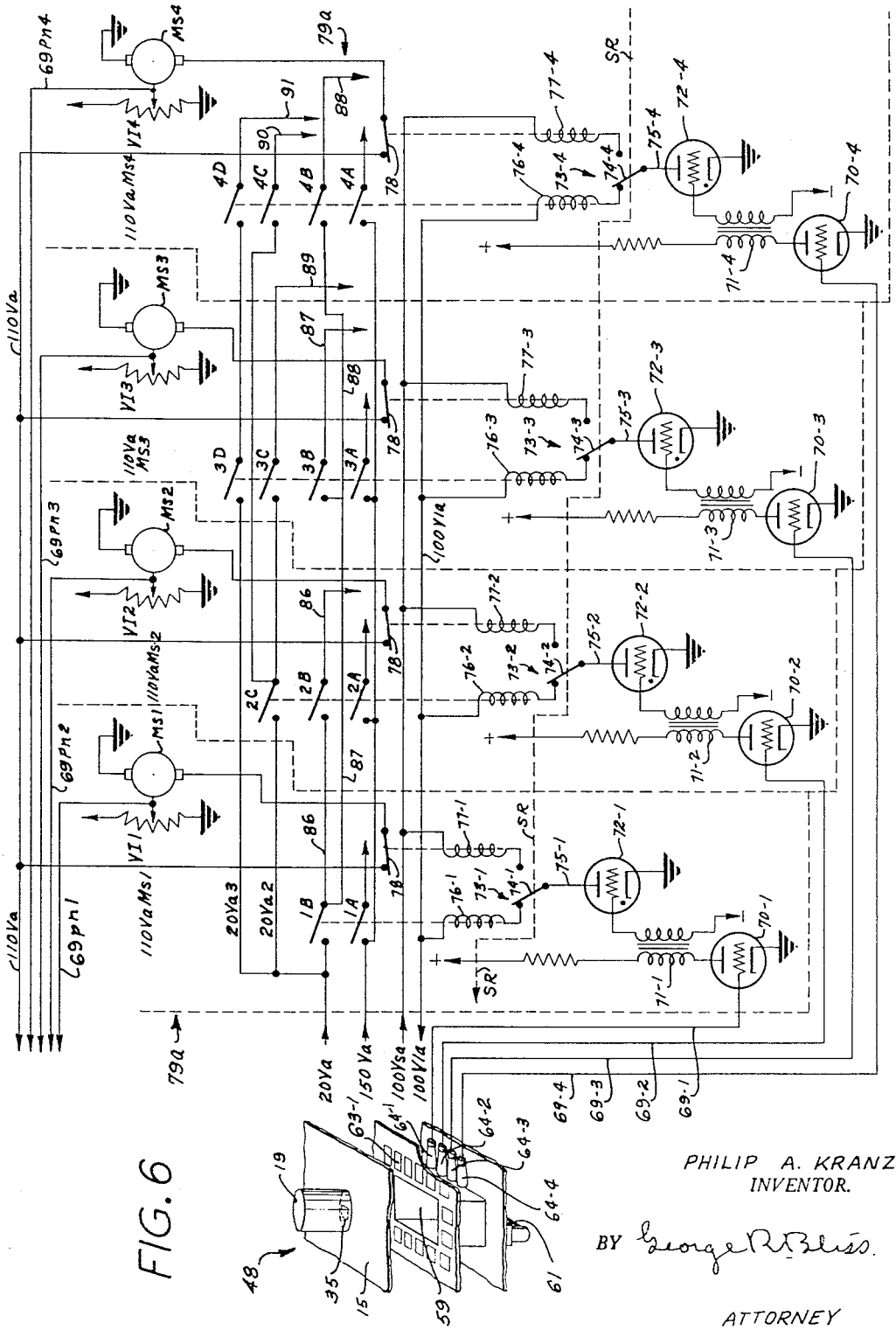

In FIGURE 6, the scanning box 48 is shown schematically with four phototubes of one only four-tube section, which will be considered as section $a$. These four phototubes are designated with the numerals 1, 2, 3, and 4, respectively, prefixed by the phototube numeral 64 placed under four filters respectively which will be identified respectively as filters 1, 2, 3, and 4 prefixed by the filter numeral 63. These four filters are colored to pass light of four small spectral bands of wave lengths, respectively, which bands will be designated as colors 1, 2, 3 and 4, respectively, prefixed by the numeral 65 which was given above as the designating numeral for the colored areas on the tags. These four phototubes and associated filters and colors on the tags are instrumental in operating ten of the register keys (not shown) which will be identified as keys 1 to 10 inclusive. For clarity of reference the remaining 12 phototubes (not shown on FIGURE 6), their associated filters and colors will be referred to and identified respectively with suffixes 11 to 14 in the second section $b$, 21 to 24 in the third section $c$, and 31 to 34 in the fourth section $d$, the section $b$ being instrumental in the operation of register keys 11 to 20, section $c$, keys 21 to 30 and section $d$ keys 31 to 40.

When color band 65–1 on a tag fluoresces under the light from lamp 61 the light rays emanating therefrom, pass through filter 63–1 and through no other of the fifteen filters. The cathode sensitive surface 66 of phototube 64–1 beneath this filter 63–1 emits electrons starting a flow of electric current, due to the positive D.C. voltage which is applied to the tube anode, in the conventional and well known manner. The current from phototube 64–1 which flows on conductor 69–1 from the anode of the phototube, is amplified in an amplifier 70–1 and is conducted thence through a transformer coupling 71–7 to the thyratron 72–1, where it triggers the flow of 100 volt direct current through a single-pole, double-throw switch 73–1. This current comes from a supply line 100V1a which is a branch (see right marginal edge portion of FIGURE 5) of main 100V.

The movable elements 74 of all sixteen switches 73 are gang connected and operable in unison either by a hand operated lever (not shown) or an operator controlled solenoid (not shown). The movable element 74–1 of switch 73–1 is thus ganged to switch elements 74–2, 74–3, and 74–4 of the other three switches so that they may be moved in unison either leftward to connect the thyratron plates through conductors 75–1 to 75–4 inclusive to solenoid relays 76–1 to 76–4 inclusive and thence to the branch supply conductor 100V1a, or moved rightward to connect the thyratron plates through conductors 75–1 to 75–4 to solenoid relays 77–1 to 77–4 inclusive and thence to a supply conductor 100Vsa which is a branch of supply conductor 100Vs (see right hand marginal edge of FIGURE 5).

All 76 relays are readied to be energized when gang switches 73 are in the leftward position, and each is energized when the current flow through its associated thyratron has been triggered by a positive charge on its grid from the associated phototube. These relays operate a system or matrix 79a of switches and conductors, shown vertically above the solenoids 76, which in association with additional switches and thyratrons (shown on FIGURE 7) and under regulation by the time control mechanism of the machine, is used to place register keys 1 to 0 in position for printing the price of an item on the register tape, in a manner to be presently explained.

All relays 77 of all four sections are readied to be energized when gang switch 73 is in its rightward position, for a purpose to be considered below.

FIGURE 7 shows the devices and circuitry by which the four phototubes 64 of any one section, for instance $a$, sensitized by the colors 65–1 to 65–4 of that section, are capable of causing the manipulation of ten keys, #1 to #0 inclusive. At the leftward end of the figure are shown the supply conductors 20Va, 150Va, −10Va, 100V2a and 100V1a, which are representations of the continuation of these conductors from the rightward end of FIGURE 5. Representations of the amplifiers 70–1 to 70–4, thyratrons 72–1 to 72–4, switches 73–1 to 73–4, relays 76–1 to 76–4, matrix 79a are repeated in FIGURE 7, the relays 77, switches 78, and their connections being omitted from FIGURE 7 for clarity.

A tag having thereon color 65–1 only, will as described above pass through filter 63–1 only, sensitize phototube 64–1, and trigger thyratron 72–1, which will actuate solenoid relay 76–1 to close normally open switch 1A in the matrix 79a, and also the normally open switch 1B in the matrix. Switch 1A is in branch conductor 150Va1 of the conductor 150Va, which leads to the mechanism for placing key #1 in position for printing on the tape. Such mechanisms for this and the other keys respectively will be referred to hereinafter simply as key #1 mechanism, etc.

When switch 1A closes, since switches 5C, 6C and 7C in the conductor 150Va1 are normally closed, conductor 150Va1 is placed in such condition that when 150 volts is applied under the time control explained below, key mechanism #1 will be operated to place key #1 in position for printing. The closing of switch 1B in conductor 20Va1, a branch of conductor 20Va, does not affect the circuitry in any way, since normally open switches 2B, 3B, and 4B, in conductors 86, 87, and 88 leading from switch 1B, remain in their open position. Similarly color tag areas 65–2, 65–3 and 65–4 each, when illuminated alone, will ready the circuitry for the application of 150 volts to actuate key mechanisms #2, #3, and #4, respectively, since in each case, the associated solenoid relays 76–2, 76–3, and 76–4 will be alone actuated, respectively, with the closing of switches 2A, 3A, and 4A respectively, in branch supply conductors 150Va2—150Va3, and 150Va4 respectively of supply conductor 150Va in the matrix 79a. Other normally open switches in the 20Va1, 20Va2 and 20Va3 conductors will be closed without effect on the circuitry of the matrix, since in each case, other normally open switches in these conductors will remain open and prevent the flow of current.

When the key mechanism #5 is to be operated this result is accomplished as follows. A tag having two colored areas 65–1, and 65–2 on the merchandise item passing through the viewing box, triggers simultaneously thyratrons 72–1 and 72–2, closing switches 1A and 2A, 1B and 2B. The grid of a thyratron 72–5, shown just to the right of thyratron 72–4 at the bottom of FIGURE 7, is connected to conductor —10Va and holds stabilized this thyratron by its negative bias. When, however, switches 1B and 2B are closed by thyratrons 72–1 and 72–2 by the action of light rays from colors 65–1 and 65–2, an overriding positive 10 volt bias is impressed on the grid of thyratron 72–5 over conductor 86 supplied by the supply main 20Va1. Thyratron 72–5 is then triggered to operate solenoid relay 76–5 with current from supply conductor 100Va2. This relay opens normally closed switches 5B and 5C preventing the operation of key mechanisms #1 and #2, and closes normally open switch 5A in the conductor 150Va5 which is a branch of conductor 150Va leading to key operating mechanism #5. Since all but this one of the conductors 150Va1 to 150Va0 are open because switches 5C, 5B, 3A, 4A, and 6A to 0A inclusive are in the open position, only conductor 150Va5 is conditioned for actuating its key mechanism when the time control permits the application of the voltage.

An examination of the circuitry of FIGURE 7 will show that the combination of colors 65–1 and 65–3 on a single tag will cause the operation of key mechanism #6, color combination of 65–1 and 65–4 will cause the operation of key mechanism #7, color combination of 65–2 and 65–3, key mechanism #8, color combination of 65–2 and 65–4, key mechanism #9 and color combination of 65–3 and 65–4 will cause the operations of key mechanism #0.

It will now be evident that each tag will have on it the color or two color combination of colors 65–1 to 65–4 capable of moving into printing position the correct key for the first digit or character of a four character line, the color or color combination of colors 65–11 to 65–14 capable of moving into printing position the correct key for the second digit or character of this four character line, and similarly the color or color combinations of colors 65–21 to 65–24, and of 65–31 to 65–34 for the third and fourth digits or characters of this four character line. Each tag will have on it a minimum of 4 and a maximum of 8 different color areas 65.

FIGURE 5 shows diagrammatically the circuitry for the time control of a single operating cycle, including control of the four key placement operations, of the printing operation, and of the stabilization of the operating elements of the machine in readiness for the next printing cycle.

It will be evident from the above explanation, that when any one or two of the four thyratrons 76–1 to 76–4 are triggered to energize their associated relays 76 by any one or two of the associated colors 65–1 to 65–4 respectively, current will flow through conductor 100V1a. Similar statement is true of thyratrons 65–11 to 65–14, 65–21 to 65–24, 65–31 to 65–34 and 65–41 to 65–44 and their associated conductors 100V1b, 100V1c and 100V1d respectively. By reference to FIGURE 5, it will be seen that the current sensitive relay 95 in series with the supply main 100V1, which leads to all conductors 100V1a to 100V1d inclusive, is energized closing normally open switches 96 and 97 in conductors 100V2 and 150Ve. The closing of switch 96 closes the circuit of conductor 100V2, which leads to conductors 100V2a, 100V2b, 100V2c, 100V2d, conditioning the circuits of the several sections for the operation of key mechanisms 5 to 0, 15 to 20, 25 to 30, 35 to 40 by the thyratron operated relays 76–5 to 76–0, 76–15 to 76–20, 76–25 to 76–30 and 76–35 to 76–40 respectively, upon the passage through the viewer of a tag with the proper two colored combination.

Closing of normally open switch 97 in the conductor 150Ve which is a branch of conductor 150V, energizes the time delay relay solenoid 98 which closes normally open switch 99 after a time interval sufficient to prevent the voltage of conductor 150V from being applied over conductors 150Va to 150Vd inclusive to any of the key mechanisms until the circuits have been completed to that one of each of the ten key mechanisms of each of the four channel sections a to d inclusive designed to be operated by the particular color or two colored combination of the tag which is currently passing through the viewer box.

Closing of switch 99 at the end of the first delay period, also sends current through branch 150Vf of conductor 150V to a relay solenoid 100 which is arranged to operate a second time delay normally open switch 101. This switch 101 after a brief delay, which permits the key mechanisms to move the selected keys to printing position, closes the circuit in a branch 150Vg of conductor 150V which leads to and electrically energizes motor M. This motor when rotated rings up the sale and prints the four character line on a tape in the conventional manner.

The motor M after the printing operation closes momentarily switch 102 in a branch 150Vh of the 150V supply conductor. Closing of switch 102 energizes the solenoid of a third time delay relay 103. This relay is of the drop out delay type, and is energized by the momentary application of voltage through switch 102 in conductor 150Vh. Its solenoid contacts stay closed for a fixed period of time after removal of the voltage by the opening of switch 102. The time delay switch 103 during the period of its energization, opens and holds open normally closed switch 104 in the supply conductor 100V, and normally closed switch 105 in the supply conductor 150V, interrupting the supply of current to the key and relay circuits, causing the removal of voltage from the key mechanisms, allowing them to return to normal position, and removing voltage from the thyratron operated relays long enough to insure deionization of the thyratrons and complete deactivation of the relay matrix.

In the operation of the machine, ganged switches 73 are thrown from the leftward "run" position to the rightward "set" position for reset and re-establishment of phototube amplifier sensitivity. When these switches are thrown to the set position, their respective switch arms 74 connect the anodes of the associated thyratrons respectively with the relay solenoids 77. As explained above not only all the switch arms 74 in section a shown in FIGURES 6 and 7 are gang connected as indicated by the dash line SR, but also the arms 74 in the other three sections are gang connected to the arms of section a, as well as to each other by the gang connection SR (see leftward end of FIGURES 6 and 7).

As shown at right end of FIGURE 5, this gang switch SR may be hand or relay operated as indicated symbolically at 110. Also shown adjacently to the left of switch operating means 110 is a switch 111 in a conductor supply line 110V which has branches a, b, c, and d (see rightward end of FIGURE 5) each leading to a group of four "set" motors Ms parallel connected to the branch 110Va line of the section. (See FIGURE 6.) The application of voltage to each of these motors is separately controlled by an associated normally closed switch 78 in its associated circuit 110VaMs1. This switch is opened by energization of the associated relay solenoid 77. Each solenoid 77 is energized by the triggering of the associated thyratron 72, which occurs when the gang switch SR has been thrown to the right, throwing the switch arms 74 to the right to the position for the potential triggering of the thyratron, and when the grid of any one thyratron is at a potential sufficient to initiate the flow of current from the cathode to the anode of the thyratron, i.e. to trigger the thyratron.

When any particular solenoid 77 is energized it opens its associated normally closed switch 78. Since the rightward throw of switch 111 is made by the gang switch SR simultaneously with the rightward throw of all the switch arms 74, and since all the switches 78 are normally closed, all of the motors Ms1 to 4, Ms11 to 14, Ms21 to 24 and Ms31 to 34 simultaneously begin turning. Each operates an associated variable impedance VI1, VI2, VI3, etc., each of which is in an associated circuit 69pn1, 69pn2, etc., which applies voltage to the positive anode of its associated phototube 64.

As each motor Ms decreases the impedance VI in the anode circuit of the phototube from an automatically set initial maximum and correspondingly increases the potential, the thyratron 72 triggers at a potential in the phototube anode circuit determined by any particular chromatic and intensity value of the light rays impinging upon the phototube, by the potential in the electrical supply and by the particular value of any other variable at the time.

By inserting a tag or tags with all the standard colors, simultaneously presented to the filters and phototubes each color being associated with its own filter and phototube, each amplifier is periodically reset for a standard color to avoid drifting or possible cross channel activation by the near colored tags. When the thyratron is triggered at the proper potential in the phototube anode circuit, the associated switch 78 is opened stopping the corresponding motor Ms.

This resetting may be done manually or automatically, either at times of work break of the personnel, or when a total is rung on the register for each customer.

A monitor phototube device is indicated at 112 in FIGURE 1, which, in a manner well known in the conveyer art, may be designed to provide for stopping the conveyer until the item is removed, if absence of a tag, or faulty operation prohibits activation of the register keys prior to the time the item breaks the infrared light beam at the position of the device 112.

In that adaptation of the invention specifically described and illustrated herein, some of the details of construction have been omitted because of their obvious character, and the apparent manner in which they would be constructed and operated within the scope of the general principles of the invention. Thus for example in the operation of a price register, the totalizing of the price of several articles purchased by one customer and the clearing of the register for the prices of the articles purchased by the next following customer, might well be provided, if desired, by providing a supply of blocks, bars or other customer identifying objects, one of which may be placed on the conveyer next behind the last article of the purchases of one customer, all of these blocks or bars being distinctively marked with the same identifying color which when scanned, causes the price register to total the prices of the preceding articles, and clear itself for the registering of the purchases of the next following customer.

Thus also the price tape of the purchases of each customer may be automatically severed and delivered to the packaging platform 17 for placement in the bag or other container with the purchased articles of a customer, or it may be delivered to a position convenient to the packer where it may be grasped by the packer and placed in the container.

I claim:
1. Apparatus for determining the classification of a plurality of separate articles of different sizes and shapes, at least some of said articles having areas thereon of different combinations of chromatic colors to reflect corresponding different color combinations of light, whereby each corresponding color combination on each article is employed to designate the particular classification thereof, said apparatus comprising: sensing means responsive to light reflected from said colored areas to produce a different corresponding output signal for each of a plurality of said colors; a conveyor system to transport said articles seriatim to and from a sensing station adjacent said sensing means; means to illuminate said colored areas on said articles when each article is positioned at said sensing station; shielding means to prevent light reflected from said colored areas from illuminating said sensing means both before and after each article is positioned at said sensing station by said conveyor system; a plurality of two-state devices responsive to different combinations of said sensing means output signals generated by different corresponding color combinations on said articles for temporarily storing each sensing means output signal combination until light reflected from a particular article positioned at said sensing station is thereafter prevented from illuminating said sensing means by said shielding means; accumulation means for automatically registering the combination of the states of said two-state devices corresponding to the color combination on said particular article only after light reflected from all of said colored areas on all of said articles is prevented from illuminating said sensing means by said shielding means; and means for automatically resetting said two-state devices to their original states only after operation of said accumulation means to register the combination of the states of said two-state devices corresponding to the color combination of said particular article and before said immediately succeeding article is removed from said sensing station by said conveyor system.

2. Apparatus for determining the classification of a plurality of separate articles of different sizes and shapes, at least some of said articles having areas thereon of different combinations of chromatic colors to reflect corresponding different color combinations of light, whereby each corresponding color combination on each article is employed to designate the particular classification thereof, said apparatus comprising: sensing means responsive to light reflected from said colored areas to produce a different corresponding output signal for each of a plurality of said colors; a conveyor system to transport said articles seriatim to and from a sensing station adjacent said sensing means; means to illuminate said colored areas on said articles when each article is positioned at said sensing station; shielding means to prevent light reflected from said colored areas from illuminating said sensing means both before and after each article is positioned at said sensing station by said conveyor system; a plurality of two-state devices responsive to different combinations of said sensing means output signals generated by different corresponding color combinations on said articles for temporarily storing each sensing means output signal combination by different corresponding combinations of said two-state devices changing their states and remaining in said changed states until light reflected from all of said colored areas on a particular article positioned at said sensing station is thereafter prevented from illuminating said sensing means by said shielding means; accumulation means for automatically registering the combination of the states of said two-state devices corresponding to the color combination on said particular article only after light reflected from all of said colored areas on all of said articles is prevented from illuminating said sensing means by said shielding means; and means for automatically resetting said two-state devices to their original states only after operation of said accumulation means to register the combination of the states of said two-state devices corresponding to the color combination of said particular article and before said immediately succeeding article is removed from said sending station by said conveyor system.

3. Apparatus for determining the classification of a plurality of separate articles of different sizes and shapes, at least some of said articles having areas thereon of different combinations of chromatic colors to reflect corresponding different color combinations of light, whereby each corresponding color combination on each article is employed to designate the particular classification thereof, said apparatus comprising: a plurality of individual light filtering means to pass light reflected from different corresponding ones of said colors; a plurality of photocells positioned adjacent corresponding ones of said light filtering means to produce output signals corresponding to different colors of light reflected from said colored areas; a conveyor system to transport said articles seriatim to and from a sensing station adjacent said bank of light filtering means on the side thereof opposite the side on which said photocells are positioned; means to illuminate said colored areas on said articles when each article is positioned at said sensing station; shielding means to prevent light reflected from said colored area from illuminating said photocells both before and after each article is positioned at said sensing station by said conveyor system; a plurality of two-state devices responsive to different combinations of said photocell output signals generated by different corresponding color combinations on said articles for temporarily storing each photocell output signal combination until light reflected from all of said colored areas on all of said articles is prevented from illuminating said photocells by said shielding means; accumulation means for automatically registering the combination of the states of said two-state devices corresponding to the color combination on said particular article only after light reflected from all of said colored areas on said particular article is thereafter prevented from illuminating said sensing means by said shielding means and before an article immediately succeeding said particular article is moved to said sensing station by said conveyor system; and means for automatically resetting said two-state devices to their original states only after operation of said accumulation means to register the combination of the states of said two-state devices corresponding to the color combination of said particular article and before said immediately succeeding article is removed from said sensing station by said conveyor system.

4. Apparatus for determining the classification of a plurality of separate articles of different sizes and shapes, at least some of said articles having areas thereon of different combinations of chromatic fluorescent colors to reflect corresponding different color combinations of light, whereby each color combination of each article is employed to designate the particular classification thereof, said apparatus comprising: sensing means responsive to light reflected from said colored areas to produce a different corresponding output signal for each of a plurality of said colors; a conveyor system to transport said articles seriatim to and from a sensing station adjacent said sensing means; means to illuminate said colored areas on said articles with ultraviolet light when each article is positioned at said sensing station; shielding means providing a chamber adjacent said sensing means surrounding said sensing station to prevent light from illuminating said sensing means except by reflection from colored areas of an article when it is positioned in said chamber by said conveyor system; a plurality of two-state devices responsive to different combinations of said sensing means output signals generated by different corresponding color combinations on said articles for temporarily storing each sensing means output signal combination until light reflected from all of said colored areas on a particular article positioned at said sensing station is thereafter prevented from illuminating said sensing means by said shielding means; accumulation means for automatically registering the combination of the states of said two-state devices corresponding to the color combination on said particular article only after light reflected from all of said colored areas on all of said articles is prevented from illuminating said sensing means by said shielding means; and means for automatically resetting said two-state devices to their original states only after operation of said accumulation means to register the combination of the states of said two-state devices corresponding to the color combination of said particular article and before said immediately succeeding article is removed from said sensing station by said conveyor system.

5. Apparatus for determining the classification of a plurality of separate articles of different sizes and shapes, at least some of said articles having areas thereon of different combinations of chromatic colors to reflect corresponding different color combinations of light, whereby each corresponding color combination on each article is employed to designate the particular classification thereof, said apparatus comprising: sensing means responsive to light reflected from said colored areas to produce a different corresponding output signal for each of a plurality of said colors; a conveyor system to transport said articles seriatim to and from a sensing station adjacent said sensing means; means to illuminate said colored areas on said articles when each article is positioned at said sensing station; shielding means to prevent light reflected from said colored areas from illuminating said sensing means both before and after each article is positioned at said sensing station by said conveyor system; a plurality of thyratron tubes, each of said thyratron tubes being connected to be fired in response to a corresponding one of said sensing means output signals; a plurality of relays, each of said relays having a winding and pairs of normally open and normally closed contacts, each of said relay windings being connected in series with a different corresponding one of said thyratron tubes; matrix means connecting said relay contacts in different combinations; accumulation means to register the switch combinations of said contacts; sampling means to connect said matrix means momentarily to said accumulation means only after light reflected from all of said colored areas on all of said articles is prevented from illuminating said sensing means by said shielding means; means to supply each of said thyratron tubes with predetermined anode voltages; and means to interrupt said anode voltages momentarily only after operation of said sampling means and before said immediately succeeding article is removed from said sensing station by said conveyor system.

6. Apparatus for determining the classification of a plurality of separate articles of different sizes and shapes, at least some of said articles having areas thereon of different combinations of chromatic colors to reflect corresponding different color combinations of light, whereby each corresponding color combination on each article is employed to designate the particular classification thereof, said apparatus comprising: a plurality of individual light filtering means to pass light reflected from different corresponding ones of said colors; a plurality of photocells positioned adjacent corresponding ones of said light filtering means to produce output signals corresponding to different colors of light reflected from said colored areas; a conveyor system to transport said articles seriatim to and from a sensing station adjacent said bank of light filtering means on the side thereof opposite the side on which said photocells are positioned; means to illuminate said colored areas on said articles when each article is positioned at said sensing station; shielding means to prevent light reflected from said colored areas from illuminating said photocells both before and after each article is positioned at said sensing station by said conveyor system; a plurality of thyratron tubes, each of said thyratron tubes being connected to be fired in response to illumination of a corresponding one of said photocells by reflection of light from a corresponding colored area on an article; a plurality of relays, each of said relays having a winding and pairs of normally open and normally closed contacts, each of said relay windings being connected in series with a different corresponding one of said thyratron tubes; matrix means connecting said relay contacts in different combinations; accumulation means to register the switch combinations of said contacts; sampling means to connect said matrix means momentarily to said accumulation means only after light reflected from all of said colored areas on all of said articles is prevented from illuminating said sensing means by said shielding means; means to supply said thyratron tubes with predetermined anode voltages; and means to interrupt said anode voltages momentarily only after operation of said sampling means and before said immediately succeeding article is removed from said sensing station by said conveyor system.

References Cited in the file of this patent

UNITED STATES PATENTS

| | | |
|---|---|---|
| Re. 23,385 | Knutsen | July 3, 1951 |
| 1,937,303 | Worrall | Nov. 28, 1933 |
| 2,268,498 | Bryce | Dec. 30, 1941 |
| 2,376,234 | De Castro | May 15, 1945 |
| 2,548,783 | Goldsmith | Apr. 10, 1951 |
| 2,609,928 | Doust | Sept. 9, 1952 |
| 2,612,994 | Woodland et al. | Oct. 7, 1952 |
| 2,678,725 | Jacobson | May 18, 1954 |
| 2,882,785 | Biesele | Apr. 21, 1959 |

UNITED STATES PATENT OFFICE
CERTIFICATE OF CORRECTION

Patent No. 3,004,702 October 17, 1961

Philip A. Kranz

It is hereby certified that error appears in the above numbered patent requiring correction and that the said Letters Patent should read as corrected below.

Column 6, line 1, for "alined" read -- aligned --; column 7, line 67, for "71-7" read -- 71-1 --; column 12, line 63, for "sending" read -- sensing --; column 14, line 50, strike out "bank of".

Signed and sealed this 24th day of July 1962.

(SEAL)
Attest:

ERNEST W. SWIDER
Attesting Officer

DAVID L. LADD
Commissioner of Patents